(12) United States Patent
Damiano et al.

(10) Patent No.: US 11,695,549 B2
(45) Date of Patent: Jul. 4, 2023

(54) MULTI-DEVICE REMOTE ATTESTATION

(71) Applicant: NEC Laboratories Europe GmbH, Heidelberg (DE)

(72) Inventors: Ugo Damiano, Heidelberg (DE); Felix Klaedtke, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/447,203

(22) Filed: Sep. 9, 2021

(65) Prior Publication Data

US 2023/0008003 A1      Jan. 12, 2023

Related U.S. Application Data

(60) Provisional application No. 63/219,367, filed on Jul. 8, 2021.

(51) Int. Cl.
*H04L 9/08* (2006.01)
*H04L 9/32* (2006.01)

(52) U.S. Cl.
CPC ............ *H04L 9/0841* (2013.01); *H04L 9/085* (2013.01); *H04L 9/3218* (2013.01)

(58) Field of Classification Search
CPC ...... H04L 9/0841; H04L 9/085; H04L 9/3218
See application file for complete search history.

(56) References Cited

U.S. PATENT DOCUMENTS 10,630,682 B1 * 4/2020 Bhattacharyya ...... H04L 63/061
2016/0134419 A1 * 5/2016 Smith .................... H04L 9/0833
 380/30
2021/0011984 A1 * 1/2021 Renke ................. G06F 12/1458

OTHER PUBLICATIONS

Rescorla; E., FRC 2631 Diffie-Hellman Key Agreement Method, Jun. 1999, Network Working Group; The Internet Society, pp. 1-3 and 8-9 (Year: 1999).*
Scarlata, Vinnie et al. "Supporting Third Party Attestation for Intel® SGX with Intel® Data Center Attestation Primitives," pp. 1-8, Intel Corporation, US, Dec. 2018.
Mechalas, John P., "Code Sample: Intel® Software Guard Extensions Remote Attestation End-to-End Example," Jul. 4, 2018, Intel Corporation, US, pp. 1-12.

* cited by examiner

*Primary Examiner* — Ashokkumar B Patel
*Assistant Examiner* — William B Jones
(74) *Attorney, Agent, or Firm* — Leydig, Volt & Mayer, Ltd.

(57) ABSTRACT

Systems and methods for attesting an enclave in a network. A method includes receiving, by a first device, proof information from an application provider entity that the enclave is secure, wherein the proof information includes a public part, Ga, of information used by the enclave to derive a Diffie-Hellman key in a key generation process with the application provider entity, processing, by the first device, the proof information to verify that the enclave is secure and ensuring that Ga is authentic and/or valid, deriving, by the first device, a new Diffie-Hellman key, based on Ga and x, wherein x is a private part of information used by the first device to derive the new Diffie-Hellman key, and sending, by the first device, a message including Ga and a public part, Gx, of the information used by the first device to derive the new Diffie-Hellman key to the enclave.

15 Claims, 4 Drawing Sheets

MULTI-DEVICE REMOTE ATTESTATION

CROSS-REFERENCES TO RELATED APPLICATIONS

The present application claims priority to U.S. Provisional Patent Application No. 63/219,367, filed Jul. 8, 2021, entitled "MULTI-DEVICE REMOTE ATTESTATION," which is hereby incorporated by reference in its entirety herein.

FIELD

The present invention relates to a method, system and computer-readable medium for multi-device remote attestation.

BACKGROUND

Remote attestation is one of the cornerstones in trusted computing. In a nutshell, a client checks remotely whether an enclave is running on trusted hardware and executes the intended software. In the art, the terms enclave and trusted execution environment (TEE) are used interchangeably.

Remote attestation often involves establishing a secure channel between the enclave and the client for provisioning secrets, such as keys for encrypting and decrypting messages or other sensitive data. Dedicated protocols have been designed for remote attestation. For instance, the Enhance Privacy Identification (EPID) protocol used by Intel's remote attestation service attests Software Guard Extensions (SGX) enclaves remotely. Here, the quoting enclave—a dedicated enclave on the CPU—provides a measurement of the enclave under scrutiny and Intel® attests the enclave's platform and the authenticity of the measurement. After the verification of the quote and the report from Intel, the client can provision secrets to the enclave via a secure channel established by a Diffie-Hellman key exchange. FIG. 1 shows a simplified version of the above-described remote attestation protocol. A detailed description of the EPID protocol with an example is provided online at Intel's website regarding "code-sample-intel-software-guard-extensions-remote-attestation-end-to-end-example".

More recently, Intel has released DCAP (Data Center Attestation Primitives), which enables third-party attestation on Intel CPUs with SGX support. See the whitepaper, "Supporting Third Party Attestation for Intel SGX with Intel Data Center Attestation Primitives," by V. Scarlata, S. Johnson, J. Beaney, and P. Zmijewski, for an overview on DCAP (the entire contents of which are hereby incorporated by reference herein). In particular, based on DCAP, cloud providers such as Microsoft® Azure can provide their own remote attestation protocols that attest the trustworthiness of the Intel SGX enclaves on their servers to application provider nodes, where an enclave executes critical parts of an application.

In all these settings, it is however assumed that there is a single entity that checks an enclave's trustworthiness and provisions the entity's secrets before using the enclave. For instance, in the EPID protocol in FIG. 1, it is the application provider node that checks the enclave and provisions secrets to the enclave. Note that the application provider node trusts the platform verifier node, which verifies the quoting enclave. As the application provider node trusts the platform verifier node, the application provider node in turn trusts the quoting enclave. Finally, the application provider node trusts the application enclave by verifying the quote generated by the quoting enclave. Also note that the application provider node does not trust the application, which runs as a normal process and could be altered by a compromised operating system.

SUMMARY

An embodiment of the present invention provides a protocol for remote attestation. This protocol allows multiple devices to check trusted execution environments (e.g., Intel SGX enclaves) and the provisioning of their secrets. The described protocol extends existing remote attestation protocols, relies on few trust assumptions, and minimizes the overhead for multiple devices. According to an embodiment, a method is provided for attesting an enclave and provisioning secret information in a network including an application provider entity, at least one device and an application platform executing an application including the enclave, wherein the method includes receiving, by a first device of the at least one device, proof information from the application provider entity that the enclave is secure, wherein the proof information includes a public part, Ga, of information used by the enclave to derive a Diffie-Hellman key in a key generation process with the application provider entity, processing, by the first device, the proof information to verify that the enclave is secure and ensuring that Ga is authentic and/or valid, deriving, by the first device, a new Diffie-Hellman key, K, based on Ga and x, wherein x is a private part of information used by the first device to derive the new Diffie-Hellman key, K, and sending, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
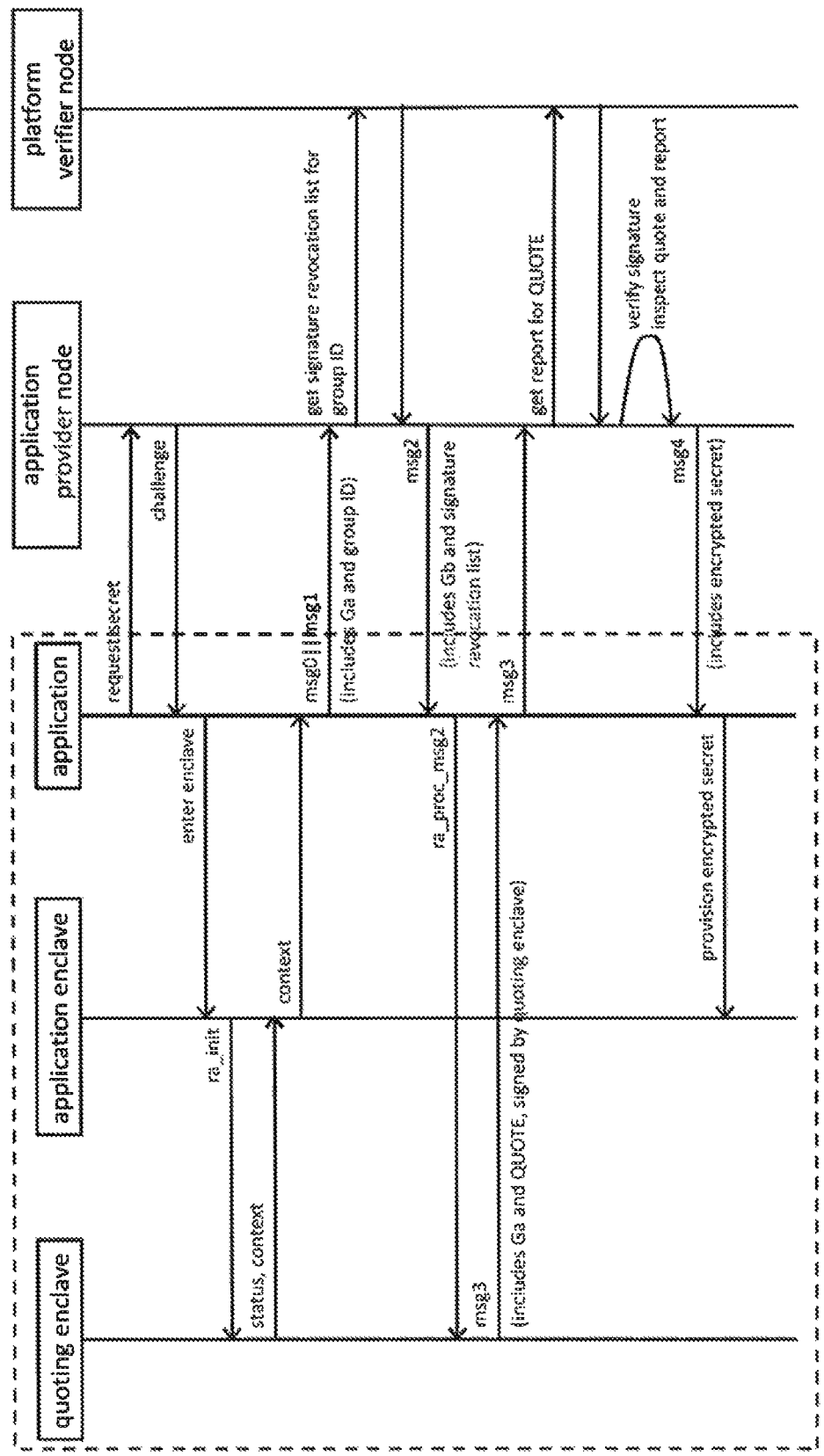
FIG. 1 illustrates EPID Remote Attestation.

According to an embodiment, a method is provided for attesting an enclave and provisioning secret information in a network including an application provider entity, at least one device and an application platform executing an application including the enclave, wherein the method includes receiving, by a first device of the at least one device, proof information from the application provider entity that the enclave is secure, wherein the proof information includes a public part, Ga, of a Diffie-Hellman key of the enclave, processing, by the first device, the proof to verify that the enclave is secure and ensuring that Ga is authentic and/or valid, deriving, by the first device, a new Diffie-Hellman key, K, based on Ga and x, wherein x is a private part of the new Diffie-Hellman key, K, of the first device, and sending, by the first device, a message including Ga and a public part, Gx, of the new Diffie-Hellman key, K, of the first device to the enclave, to enable the enclave to derive the key, K, based on Gx and the private part, a, of the Diffie-Hellman key of the enclave.

According to another embodiment, a method is provided for attesting an enclave and provisioning secret information in a network including an application provider entity, at least one device and an application platform executing an application including the enclave, wherein the method includes receiving, by a first device of the at least one device, proof information from the application provider entity that the enclave is secure, wherein the proof information includes a public part, Ga, of information used by the enclave to derive a Diffie-Hellman key in a key generation process with the application provider entity, processing, by the first device, the proof information to verify that the enclave is secure and ensuring that Ga is authentic and/or valid, deriving, by the first device, a new Diffie-Hellman key, K, based on Ga and x, wherein x is a private part of information used by the first device to derive the new Diffie-Hellman key, K, and sending, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

According to an embodiment, the receiving the proof information includes receiving a signed message generated and sent by the application provider entity, the signed message including the proof information, and wherein the proof information further includes a private part of the Diffie-Hellman key of the application provider entity.

According to an embodiment, the sending a message to the enclave includes sending a message signed by the first device, the signed message including Ga and Gx. According to an embodiment, the public part, Gx, of the new Diffie-Hellman key, K, of the first device is hard coded into the enclave, whereby the enclave is able to check the signature of the signed message.

According to an embodiment, the method further includes exchanging messages with the enclave using the new Diffie Hellman key, K.

According to an embodiment, the method further includes receiving an acknowledgement message from the enclave, the acknowledgement message having been generated by the enclave using the new Diffie-Hellman key, K.

According to an embodiment, a network device is provided in a network including an application provider entity and an application platform executing an application including the enclave, wherein the network device includes one or more processors; and a memory storing instructions, which when executed by the one or more processors cause the network device to receive, by a first device of the at least one device, proof information from the application provider entity that the enclave is secure, wherein the proof information includes a public part, Ga, of information used by the enclave to derive a Diffie-Hellman key in a key generation process with the application provider entity, to process, by the first device, the proof information to verify that the enclave is secure and ensuring that Ga is authentic and/or valid, to derive, by the first device, a new Diffie-Hellman key, K, based on Ga and x, wherein x is a private part of information used by the first device to derive the new Diffie-Hellman key, K, and to send, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

According to an embodiment, the instruction to receive the proof information include instructions to receive a signed message generated and sent by the application provider entity, the signed message including the proof information, and wherein the proof information further includes a private part of the Diffie-Hellman key of the application provider entity.

According to an embodiment, the instructions to send a message to the enclave include instructions to send a message signed by the first device, the signed message including Ga and Gx. According to an embodiment, the public part, Gx, of the new Diffie-Hellman key, K, of the first device is hard coded into the enclave, whereby the enclave is able to check the signature of the signed message.

According to an embodiment, the memory further stores instructions, which when executed by the one or more processors cause the network device to exchange messages with the enclave using the new Diffie Hellman key, K.

According to an embodiment, the memory further stores instructions, which when executed by the one or more processors cause the network device to receive an acknowledgement message from the enclave, the acknowledgement message having been generated by the enclave using the new Diffie-Hellman key, K.

According to an embodiment, a tangible, non-transitory computer-readable medium is provided that has instructions stored thereon which, upon being executed by one or more processors, alone or in combination, provide for execution of a method of attesting an enclave and provisioning secret information in a network including an application provider entity, at least one device and an application platform executing an application including the enclave, wherein the method includes any method as described herein. For example, in an embodiment, the method include receiving, by a first device of the at least one device, proof information from the application provider entity that the enclave is secure, wherein the proof information includes a public part, Ga, of information used by the enclave to derive a Diffie-Hellman key in a key generation process with the application provider entity, processing, by the first device, the proof information to verify that the enclave is secure and ensuring that Ga is authentic and/or valid, deriving, by the first device, a new Diffie-Hellman key, K, based on Ga and x, wherein x is a private part of information used by the first device to derive the new Diffie-Hellman key, K, and sending, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

According to an embodiment, the receiving the proof information includes receiving a signed message generated and sent by the application provider entity, the signed message including the proof information, and wherein the proof information further includes a private part of the Diffie-Hellman key of the application provider entity.

According to an embodiment, the sending a message to the enclave includes sending a message signed by the first device, the signed message including Ga and Gx.

Figure 2:
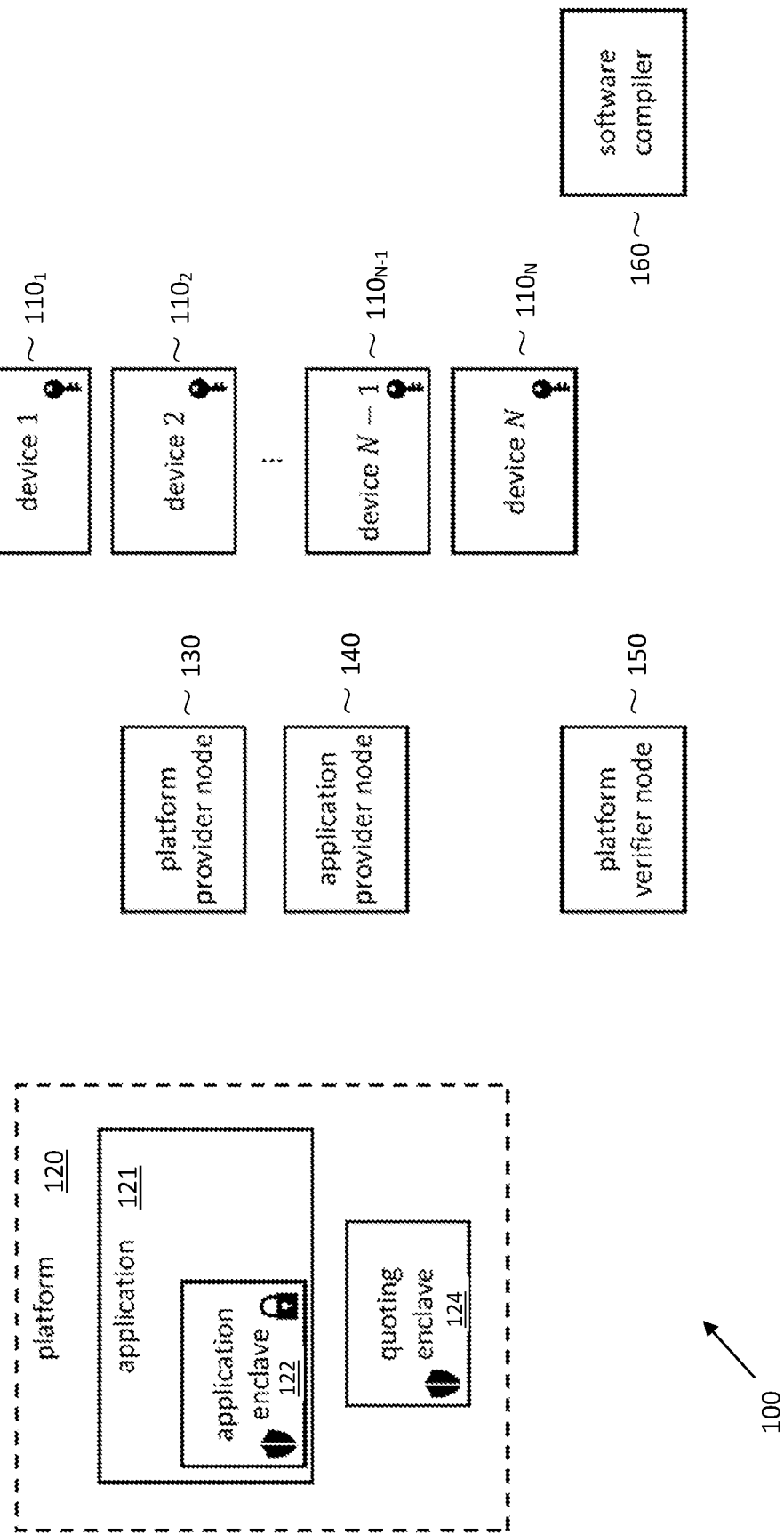
FIG. 2 illustrates a system architecture.

As compared to the EPID protocol shown in FIG. 1, consider a more complex network 100 as illustrated in FIG. 2, where an enclave 122 processes sensitive data from multiple, N, devices 110 ($110_1$-$110_N$).

Here, the multiple devices 110 do not trust each other, and neither do they trust the platform 120, nor the platform provider node 130 nor the application provider node 140. Hence, each device 110 wants to check the enclave before provisioning its own secrets. However, running a separate remote attestation protocol for each device 110 would not only result in a significant overhead, the device might also need to enter in some agreement with the platform verifier node 150 or platform provider node 130.

Accordingly, embodiments of the present disclosure provide a different, advantageous approach. In particular, embodiments herein provide a protocol where the enclave is checked once, and the devices verify the attestation results before provisioning securely their secrets. The overhead of the protocol according to the present disclosure is small, and the trust assumptions are minimal. In particular, the devices according to the present disclosure do not trust the platform/application provider node. Furthermore, the present disclosure has an advantage that changes to already existing remote attestation protocols are also minimal.

An embodiment of the present invention provides an improved protocol for remote attestation, having the following aspects:
1. The enclave may reuse key material from a previous Diffie-Hellman key exchange to obtain different symmetric keys for multiple devices; and/or
2. The application provider node forwards secret key material to devices so that the devices can verify the status of the enclave (remote attestation).

Both of the above aspects have advantages over other solutions, including that fewer messages are exchanged, without lowering the security guarantees and additional trust assumptions. For instance, by reusing key material (1) the enclave does not need to generate a secret a for each device and send the corresponding public part Ga to the device.

Figure 3:
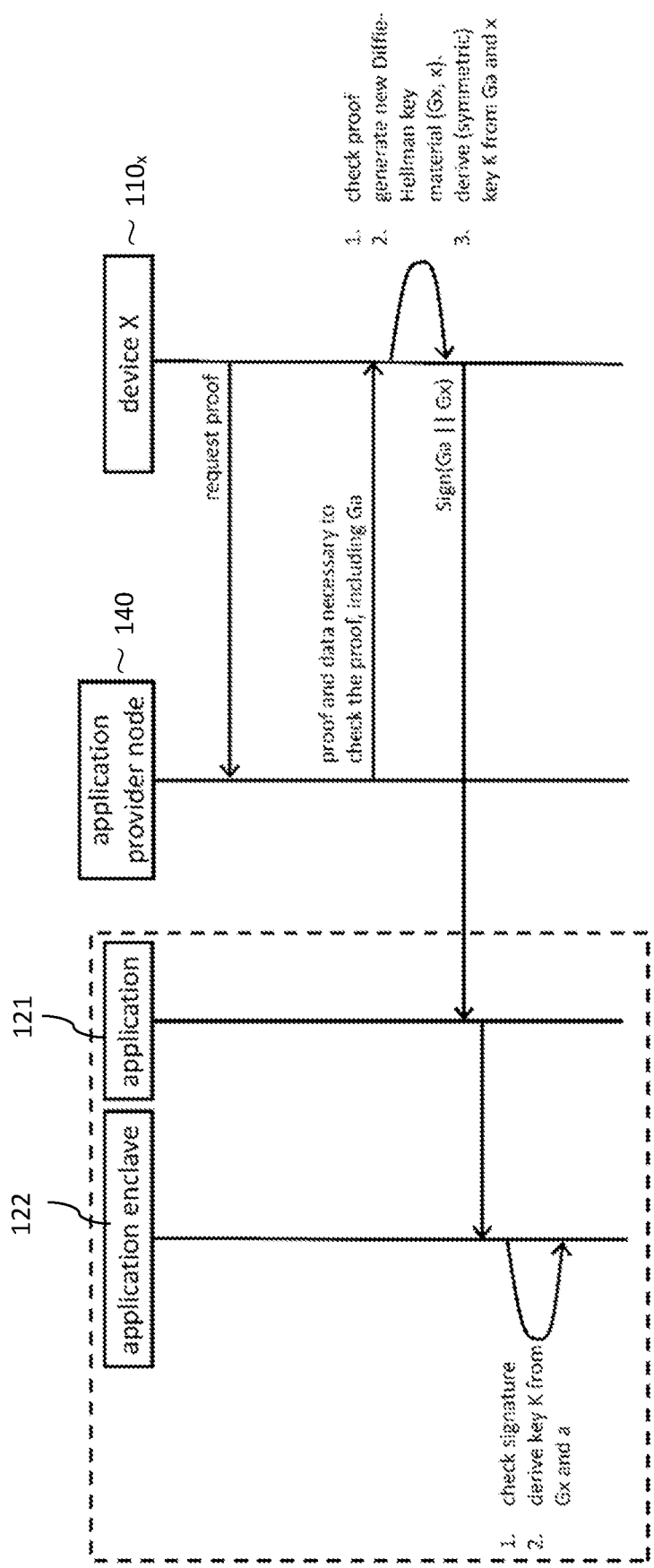
FIG. 3 illustrates an extension of a remote attestation protocol.

An embodiment of the present disclosure provides a method for multiple users to attest enclaves remotely and provision secrets. The method includes one or more of following steps (cf. the protocol steps in FIG. 3):
1. Remote attestation with the enclave is performed (between enclave and application provider node). This includes a Diffie-Hellman key exchange.
2. Upon request, the devices receive from the application provider node the values used in the Diffie-Hellman key exchange and the report attesting that these values were issued by the enclave.
3. Devices verify the correctness of the application enclave.
4. Devices derive a key from the enclave material provided and their own generated Diffie-Hellman key material.
5. Devices send the public part of the key to the application enclave.
6. The application enclave derives keys for each device from its own Diffie-Hellman key material and the devices' material.

Steps 1 to 6 may be carried out for each device, whereas step 1 precedes those steps for multiple devices. After step 6, a secure channel between each device and the enclave has been established. This channel can be used for provisioning the device's secrets. Note that in step 5, a device can already provision secrets together with the device's public part of the key.

System Architecture

In the following, the underlying system architecture, including the involved entities, is described. FIG. 2 provides an overview of relevant entities, according to an embodiment.

The platform 120 includes the hardware and operating system on which the application 121 runs. The platform 120 could be an edge node in a network or a server in the cloud. Note that the platform 120 can host multiple applications, e.g., in different virtual machines, from different application provider nodes.

An application 121 receives, processes, and outputs data. An application is split into an unprotected part and a protected part. Intuitively speaking, sensitive data is handled by the application's protected part.

An application enclave 122 is a protected part of an application 121. Note that an application 121 can have multiple enclaves 122.

The quoting enclave 124 is a special enclave that can measure other enclaves. It does not belong to a specific application.

The platform verifier node 150 is usually a node of the hardware manufacturer of the platform CPU, e.g., Intel in case the platform runs CPUs with Intel SGX. Technologies such as DCAP still have the hardware manufacturer as root of trust but allow the verification to be performed by another entity. The devices 110 trust the platform verifier node 150.

The platform provider node 130 is the owner of the platform 120. For instance, in case the platform is a cloud server, the platform provider node would be a node of the cloud service provider like Microsoft Azure or Amazon Web Services.

application provider node 140 owns the application 121, which provides a service to devices 110. In particular, the application provider node 140 has installed and configured the application 121 on the platform 120. Note that the application provider node 140 can be the same entity as the platform provider node 130. The application provider node 140 could also be one of the devices 110.

The devices 110 process their data through an application 121. For example, the devices 110 send data to the application 121, the application processes the data, and the output is sent back to the devices.

The software compiler 160 compiles the enclave source code. Additionally, the software compiler 160 outputs a hash of the produced binary. The software compiler could be a virtual machine or container, which the users download and run on their computers to obtain the hash of the code that should run in the enclave. The software compiler 160 contains all the necessary tools and libraries to compile the enclave source code. Alternatively—or in addition—every device 110 could have its own software compiler. However, note that the hashes may differ if, e.g., different versions of a compiler or different compilation flags are used. It is therefore important that the application provider node 140 and devices 110 use the same environment for compiling the enclave source code. A device could compare the hashes resulting from its own software compiler and the software compiler provided by the container. The devices 110 trust the software compiler 160. If the source code of an enclave 122 is not available or a device 110 does not have the computational resources for compiling the enclave source code, the device could obtain the hash of the binary through a trusted source. Furthermore, if a device is itself a program, the enclave's hash could be hardcoded.

Some of the entities shown in FIG. 2 can actually be the same entity but this entity acts then in different roles. For instance, if the application 121 runs on the hardware that is owned by the application provider node 140, then the application provider node 140 and platform provider node 130 are the same entity. This entity can act in the roles of the application provider node or the platform provider node.

Enclaves 122 provide integrity and confidentiality guarantees on the processed data. Enclaves 122 are separated from each other and each enclave has its own protected memory. In the case that the host operating system running on top of the platform 120 could be compromised, an attacker has full control over the public part of an application. However, as enclaves are isolated parts on the platform and not under the control of the host operating system, an attacker cannot access the enclave's memory or modify the code that is executed in the enclave, unless the hardware is also compromised or the enclave's keys have leaked.

For authentication, in certain embodiments a public-private key infrastructure is assumed. In particular, for authenticating the application provider node 140 when checking the enclave 122 remotely, the public key of the application provider node 140 is usually hardcoded into the code of the enclave 122. The key's authenticity is ensured when attesting the enclave 122 and measuring the enclave's code. Any change to the code, including a change to the hardcoded public key, will result in different measurements. For the enclave 122 to authenticate a device 110, the enclave must also possess the device's public key. This can, e.g., be achieved by additionally hardcoding the device's public key into the enclave code.

In some applications, it is not necessary that the enclave 122 authenticates the device 110. Hence, there is no need to add a device's public key to the enclave's code. The authenticity of the enclave is ensured by the quoting enclave and the platform provider node, which is trusted by the devices and checks the CPU's platform. That means, a device does not need to possess a public key of the enclave in advance to authenticate the enclave and no private key must be hardcoded into the enclave code.

Instantiations and example use cases of the system architecture are described with reference to FIG. 2.

One example use case is system monitoring, where a monitor observes the behavior of multiple system components, possibly owned or operated by different entities. The monitor continuously obtains information about the components' states and actions, and compares and analyzes the obtained information. The monitor raises an alarm if observing abnormal behavior from one or multiple components, when a component enters an unsafe state, or the reported actions carried out by the components are not policy compliant. The monitor may even take corrective actions like restarting, isolating, or terminating components.

Here, the monitor is the application 121 and its provider node is the application provider node 140. Furthermore, the components are the devices 110 of the system architecture in FIG. 2. The owner of the computer on which the monitor is executed is the platform provider node 130. If the application provider node 140 uses its own computers, application provider node 140 and platform provider node 130 are the same entity, whereas if the application 121 runs in the cloud or a network node, the platform provider node 130 is the cloud provider node or a node of the network operator, respectively. Finally, the manufacturer of the platform's CPU is the platform verifier node 150.

The data sent to the monitor is often sensitive since it contains information about a component's state. Hence, the communication to the monitor must be secured. In particular, data must be sent encrypted to the monitor and the monitor must have the corresponding information, e.g., keys, for decrypting the data. The monitor itself is protected by executing its critical part inside an enclave. However, when initializing the monitor, its enclave must obtain the keys for communicating with the components. Furthermore, the components want to check the enclave before provisioning their secrets, e.g., the key material to secure the communication between components and the monitor.

The communication between the components and the monitors should be minimized, particularly if the components operate under power and communication constraints like small IoT devices. The monitor may also have limited bandwidth and computational resources, e.g., when it is executed on an edge node of the network. To this end, attesting and checking the monitor enclave, and secret provisioning should be done efficiently and should not wastefully use the available resources.

Other use cases, related to the above one with similar requirements, include stream processing. Here, components continuously send data to a stream processor, which analyzes the data in real time and forwards the obtained analysis results further. The application areas of such stream processors are numerous and include intrusion, surveillance, fraud detection, and data mining like in advertising and electronic trading. As the monitor in the above monitoring use case, the stream processor may receive sensitive data from multiple data sources. The owners of these data sources (i.e., the devices that generate the data) may want to check the stream processor first before sending sensitive data to it. Analogously, the analysis results may also contain sensitive information and the devices of the data consumers also want to check the stream processor first before receiving sensitive data from it. In particular, the data sent to and processed by the stream processor can be sensitive and the data processing may be regulated. For example, in surveillance, the data sources can be IoT devices like cameras in a public area or private buildings or location trackers. When analyzing the received data, e.g., face or voice recognition, neither the data itself should leak nor the results of the analysis. Hence, data should always be encrypted when transferred to another entity, the entities should be authenticated, and the trustworthiness of the entities should be checked.

More generally speaking, the architecture has applications in computations that involve data sets (not necessarily data streams) with sensitive information from different devices. Here, devices, i.e., the data owners, do not want that their data leaked to other devices. Data leakage is prevented by sending the data encrypted to the enclaves. Only the respective data owner and the enclaves possess the key for decrypting the data. Furthermore, the data owners check the enclaves prior to sending data to the enclaves.

Remote Attestation Protocol

In the following, a remote attestation protocol according to an embodiment is described. The remote attestation protocol gives the application provider node the ability to provide multiple devices 110 with a secure channel to an enclave 122. The remote attestation protocol also provides devices with the possibility to check that the enclave 122 is running the expected software. The remote attestation protocol may be an extension for most existing remote attestation protocols. The protocol may be referred to as an "extension" because it is carried out in combination with another remote attestation protocol between the enclave 122 and the application provider node 140. It may be assumed that the application provider node 140 can provide two things to a device 110. The first one is a proof that the enclave 122 behaves as expected. This proof can have been generated by the application provider node 140 by using the remote attestation protocol proposed by the hardware manufacturer. The second one is a Diffie-Hellman key material's public part generated by the enclave 122. Moreover, the enclave 122 should be the only one to know the private part of the material. For a device 110, the extension consists of the steps shown in FIG. 3.

In EPID, the Diffie-Hellman key material's public part is included in the proof generated during remote attestation. Therefore, this proof not only proves that the enclave 122 is correct but also that the public part is authentic and was generated by the enclave 122. Other remote attestation protocols like the one based on DCAP and implemented by Microsoft Azure also allow the enclave to tie data to the proof.

First, device X $110_X$ wants to check that the enclave 122 is indeed in a correct and safe state. Device X also wants to establish a secure channel with the enclave 122. To this end, device X requests the proof, the public part of the enclave's Diffie-Hellman key material Ga, and any data needed to check the proof from the application provider node 140. Without loss of generality, it may be assumed that checking the proof also ensures that Ga is authentic. The message to device X usually includes the signed quote as in the case of the EPID protocol (cf. FIG. 2). In case of the EPID protocol, the message also includes the application provider node's secret part b of the Diffie-Hellman key material. It should be appreciated that different variants of the Diffie-Hellman key agreement protocol may be used herein. For example, one variant uses the multiplicative group of integers modulo p, where p is prime and g is a primitive root of p. p and g are also called domain parameters. As an example, Alice and Bob have to agree on p and g in advance. The secret (of either Alice or Bob) is a positive integer x. The public part is Gx=g^x mod p. The resulting symmetric key is g^ab mod p, where a and b are the secrets of Alice and Bob, respectively. Note that Alice receives from Bob Bob's public part Gb and computes Gb^a mod p=g^b^a mod p=g^ba mod p=g^ab mod p. Other variants may include an elliptic-curve Diffie-Hellman protocol, which is based on elliptic curve cryptography, with other domain parameters, or variants for quantum computers.

Once the application provider node 140 has provided this data to device X, device X checks the validity of the proof. Furthermore, it also checks that the code running on the enclave 122 is the expected code. If one of these checks fails, device X stops the protocol. If all the checks succeed, device X knows that the platform 120 can be trusted and that the enclave 122 is the sole owner of the private part a of Ga.

To establish a secure channel with the enclave 122, device X generates new Diffie-Hellman key material and derives the key K based on x—the private part of its part of the key—and Ga. Now, only device X possesses the key K as it is the only device 110 to have access to x. To share it with the enclave 122, device X sends Sign(Ga||Gx) to the enclave 122. This allows the enclave 122, based on a and Gx, to also derive the key K. Here, Sign(m) denotes the digitally signed message m, where the private/public key-pair of device X is used to sign the message m. Note that the enclave 122 can check the signature, since device X's public key is hardcoded into the enclave. The signature in the message to the application enclave 122 is used to ensure that the enclave is exchanging messages with an entity it trusts. Since both the application provider node 140 and the device X have proved the enclave's correctness, they also know that the list of one or more device(s) trusted by the enclave 122 is the same as the list specified in the enclave source code. For example, the enclave's source code may contain a list of public keys. These are the public keys of the devices that the enclave trusts. This list may be hardcoded into the enclave code. Changing this list would result in a different hash of the binary and would thus be detected by device X. Since device X has checked the hash (and also the source code), it knows that the enclave will only accepts signatures that belong to entries of this list. Including Ga into the message allows the enclave 122 to check that device X used the correct Ga to compute the key K and if not, aborts the protocol. More importantly, this prevents the reuse of Gx from another protocol run between device X and another enclave. Finally, Ga indicates to the enclave 122 that this message aims at establishing a key and must be treated as such.

An attacker could replay such a message that does not include Ga and fool the enclave to use a wrong key. No information would leak. However, the communication between device X and the enclave 122 would fail.

Finally, once the enclave 122 receives the message containing Gx, it checks the signature and that Ga is indeed the Ga it generated. If the check succeeds, the enclave derives the key K from Gx and a. Afterwards, K can be used to securely exchange messages between device X and the enclave 122. If the check however fails, the enclave 122 discards the message.

The material needed for device X to check the proof also includes the secret established between the application provider node 140 and the enclave 122. This is not an issue since the application provider node 140 could start another remote attestation protocol or run the extension to get another key. In the case of the EPID protocol, the secret is not used for encryption and decryption. Second, as remarked earlier, signing Ga||Gx and storing the device's public key inside the enclave 122 are optional steps if there is no need to authenticate the device. An attacker could tamper with the message. This would result in wrong keys and the communication between device X and the enclave 122 would fail. But no information would leak Further refinements of the extension can be undertaken depending on the use case, examples of which follow. (1) To reduce the number of messages sent to the enclave and avoid establishing a new channel with the enclave for each device, the application provider node can act as a proxy, i.e., protocol messages are gathered and forwarded by the application provider node once each device has sent its material. (2) To provide faster exchanges, device X can directly send sensitive data encrypted to the enclave by using the key K along with the message Sign(Ga||Gx). (3) In the protocol above, the enclave does not acknowledge the successful generation of the key K. For notifying device X that the enclave is ready to receive encrypted data, the enclave can, e.g., send an encrypted message (using the key K) back to device X with an okay. (4) In the protocol above, device X does not send abort messages in case of a failure, e.g., when one of its checks fails. Device X can send (instead of Sign(Ga||Gx)) a signed abort message to the enclave explaining the reason for the abort. Furthermore, device X can also contact the application provider node so that the application provider node can in turn take corrective actions for fixing the problem, e.g., reinstalling the application or migrating to another platform. (5) The devices and the enclave can timeout if they do not receive the expected message within a given period of time. In particular, the enclave could timeout if it does not receive the message Sign(Ga∥Gx) from device X within the given time period. Note however that this assumes that the enclave has access to a trustworthy time source. If an attacker controls the time source of the enclave's platform, the attacker can block the enclave or "disable" devices.

Refreshing Keys

Both a device 110 and the application enclave 122 can refresh their shared key for their secure channel. Refreshing keys can, e.g., be done periodically when the application enclave continuously receives data from the devices. To this end, only one entity—application enclave 122 or device 110—needs to generate a new secret and must send the public part over the secure channel. For instance, if the application enclave wants to refresh the key with device X, the application enclave generates a new secret a' for device X and sends the public part Ga' encrypted to device X. For encryption, the application enclave uses the previous key K, which is based on the previous secret a and Gx. Furthermore, the application enclave derives the new key K' based on a' and Gx. When device X receives the message, device X decrypts the message with the key K and derives the new key K' based on x and Ga'. The device must keep its secret x from the key K for deriving the key K'. However, the device and the application enclave do not run a full Diffie-Hellman key exchange protocol here.

If the new key K' is not confirmed by device X, e.g., with an additional acknowledge message, the application enclave can continue to use the previous key K as long as it receives the first message from device X that is encrypted with the new key K'. The application enclave may also refresh the key again in case device X continues to send messages encrypted by using the key K (e.g., because the first key refresh message was lost).

The case where device X initiates the update of the key is similar.

Figure 4:
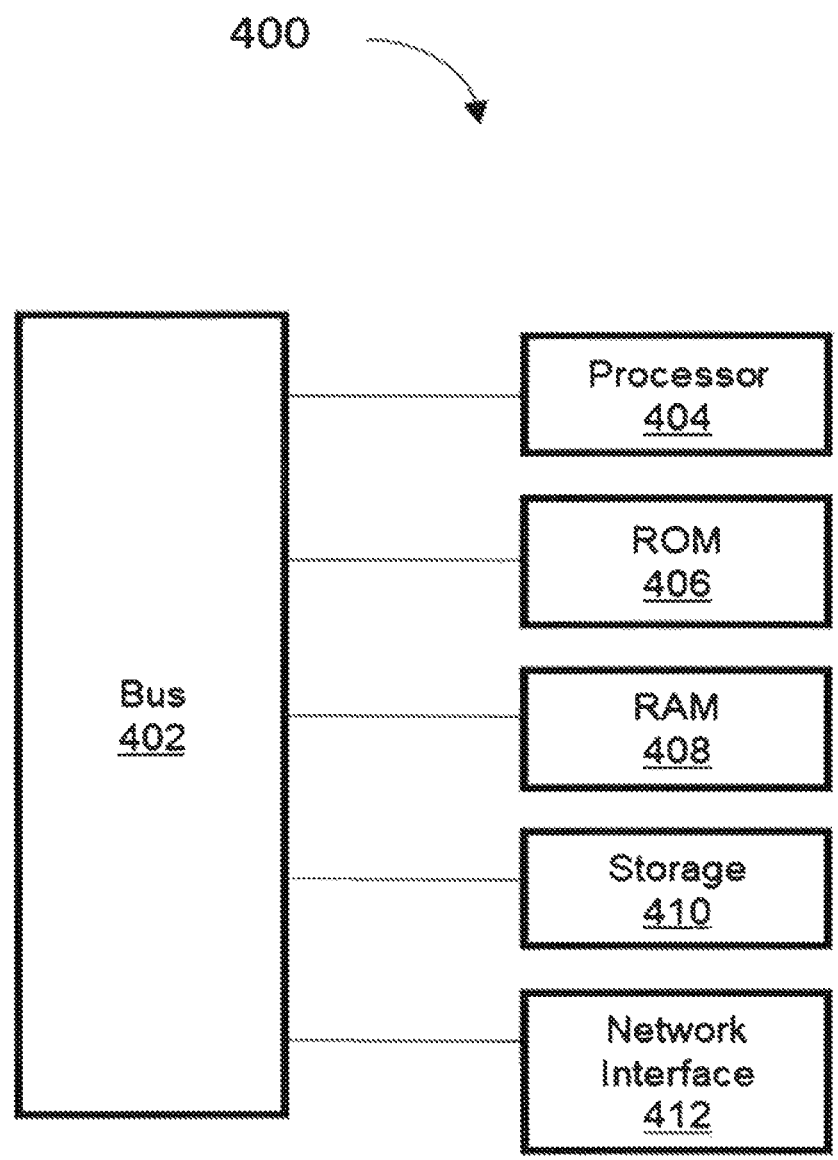
FIG. 4 is a block diagram of a processing system according to an embodiment.

FIG. 4 is a block diagram of a processing system 400 according to an embodiment. The processing system 400 can be used to implement the protocols, devices, mechanisms, systems and methods described above and herein. For example, each functional node or entity or device may include a processing system 400, or two or multiple nodes or devices may be implemented by a processing system 400. A processing system 400 may include a processor 404, such as a central processing unit (CPU) of a computing device or a distributed processor system. The processor 404 executes processor-executable instructions for performing the functions and methods described above. In embodiments, the processor executable instructions are locally stored or remotely stored and accessed from a non-transitory computer readable medium, such as storage 410, which may be a hard drive, cloud storage, flash drive, etc. Read Only Memory (ROM) 406 includes processor-executable instructions for initializing the processor 404, while the random-access memory (RAM) 408 is the main memory for loading and processing instructions executed by the processor 404. The network interface 412 may connect to a wired network or cellular network and to a local area network or wide area network, such as the Internet, and may be used to receive and/or transmit data, keys, or other information, etc. as described herein. In certain embodiments, multiple processors perform the functions of processor 404.

Embodiments of the present invention provide many advantages over the current state of the art. For example, embodiments require less overhead for remote attestation in settings where an enclave processes data from multiple devices with no additional trust assumptions. In particular, fewer and smaller messages are exchanged when attesting the enclave remotely.

According to an embodiment, for authenticating the devices, their public keys are hardcoded into the enclave code to ensure the keys' authenticity.

In general, embodiments of the disclosure have applications in processing sensitive data from multiple devices/sources. For instance, embodiments of the present disclosure allow for the deployment of secure monitors on edge nodes. The overhead in attesting the monitors and provisioning the secrets is minimized by the embodiments of the invention.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive. It will be understood that changes and modifications may be made, by those of ordinary skill in the art, within the scope of the following claims, which may include any combination of features from different embodiments described above.

The terms used herein should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of attesting an enclave and provisioning secret information in a network including an application provider entity, at least one device and an application platform executing an application including the enclave, the method comprising:

receiving, by a first device of the at least one device, proof information from the application provider entity that the enclave is secure, wherein the proof information includes a public part, Ga, of information used by the enclave to derive a Diffie-Hellman key in a key generation process with the application provider entity, wherein the first device is remote from the application provider entity and the application platform, and wherein the first device does not trust either the application provider entity or the application platform;

processing, by the first device, the proof information to verify that the enclave is secure and ensuring that Ga is authentic and/or valid;

deriving, by the first device, a new Diffie-Hellman key, K, based on Ga and x, wherein x is a private part of information used by the first device to derive the new Diffie-Hellman key, K; and sending, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

2. The method according to claim 1, wherein the receiving the proof information includes receiving a signed message generated and sent by the application provider entity, the signed message including the proof information, and wherein the proof information further includes a private part of the Diffie-Hellman key of the application provider entity.

3. The method according to claim 1, wherein the sending of a message to the enclave includes sending a message signed by the first device, the signed message including Ga and Gx.

4. The method according to claim 3, wherein the public part, Gx, of the new Diffie-Hellman key, K, of the first device is hard coded into the enclave, whereby the enclave is able to check the signature of the signed message.

5. The method according to claim 1, further including exchanging messages with the enclave using the new Diffie Hellman key, K.

6. The method of claim 1, further including receiving an acknowledgement message from the enclave, the acknowledgement message having been generated by the enclave using the new Diffie-Hellman key, K.

7. A network device in a network including an application provider entity and an application platform executing an application including the enclave, the network device comprising:
one or more processors; and a memory storing instructions, which when executed by the one or more processors cause the network device to:
receive, by a first device of the at least one device, proof information from the application provider entity that the enclave is secure, wherein the proof information includes a public part, Ga, of information used by the enclave to derive a Diffie-Hellman key in a key generation process with the application provider entity, wherein the first device is remote from the application provider entity and the application platform, and wherein the first device does not trust either the application provider entity or the application platform;
process, by the first device, the proof information to verify that the enclave is secure and ensuring that Ga is authentic and/or valid;
derive, by the first device, a new Diffie-Hellman key, K, based on Ga and x, wherein x is a private part of information used by the first device to derive the new Diffie-Hellman key, K; and
send, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

8. The network device of claim 7, wherein the instruction to receive the proof information include instructions to receive a signed message generated and sent by the application provider entity, the signed message including the proof information, and wherein the proof information further includes a private part of the Diffie-Hellman key of the application provider entity.

9. The network device of claim 7, wherein the instructions to send a message to the enclave include instructions to send a message signed by the first device, the signed message including Ga and Gx.

10. The network device of claim 9, wherein the public part, Gx, of the new Diffie-Hellman key, K, of the first device is hard coded into the enclave, whereby the enclave is able to check the signature of the signed message.

11. The network device of claim 7, wherein the memory further stores instructions, which when executed by the one or more processors cause the network device to exchange messages with the enclave using the new Diffie Hellman key, K.

12. The network device of claim 7, wherein the memory further stores instructions, which when executed by the one or more processors cause the network device to receive an acknowledgement message from the enclave, the acknowledgement message having been generated by the enclave using the new Diffie-Hellman key, K.

13. A tangible, non-transitory computer-readable medium having instructions thereon which, upon being executed by one or more processors, alone or in combination, provide for execution of a method of attesting an enclave and provisioning secret information in a network including an application provider entity, at least one device and an application platform executing an application including the enclave, the method comprising:
receiving, by a first device of the at least one device, proof information from the application provider entity that the enclave is secure, wherein the proof information includes a public part, Ga, of information used by the enclave to derive a Diffie-Hellman key in a key generation process with the application provider entity, wherein the first device is remote from the application provider entity and the application platform, and wherein the first device does not trust either the application provider entity or the application platform;
processing, by the first device, the proof information to verify that the enclave is secure and ensuring that Ga is authentic and/or valid;
deriving, by the first device, a new Diffie-Hellman key, K, based on Ga and x, wherein x is a private part of information used by the first device to derive the new Diffie-Hellman key, K; and
sending, by the first device, a message including Ga and a public part, Gx, of the information used by the first device to derive the new Diffie-Hellman key, K, to the enclave, to enable the enclave to derive the key, K, based on Gx and a private part, a, of the information used by the enclave to derive the Diffie-Hellman key in the key generation process with the application provider entity.

14. The non-transitory computer-readable medium according to claim 13, wherein the receiving the proof information includes receiving a signed message generated and sent by the application provider entity, the signed message including the proof information, and wherein the proof information further includes a private part of the Diffie-Hellman key of the application provider entity.

15. The non-transitory computer-readable medium according to claim 13, wherein the sending a message to the enclave includes sending a message signed by the first device, the signed message including Ga and Gx.

\* \* \* \* \*